United States Patent
Lyons et al.

[19]

[11] Patent Number: 5,864,217
[45] Date of Patent: Jan. 26, 1999

[54] SWITCHED RELUCTANCE MACHINE WITH TOOTHED-WHEEL ROTOR SENSOR

[75] Inventors: James Patrick Lyons; Mark Alan Preston, both of Niskayuna, N.Y.

[73] Assignee: General Electric Company, Schenectady, N.Y.

[21] Appl. No.: 854,127

[22] Filed: May 8, 1997

[51] Int. Cl.⁶ .................................................. G05B 1/06
[52] U.S. Cl. ........................................... 318/652; 318/715
[58] Field of Search ................................. 318/696, 701, 318/254, 715, 652

[56] References Cited

U.S. PATENT DOCUMENTS

| | | | |
|---|---|---|---|
| 4,772,839 | 9/1988 | MacMinn et al. | 318/696 |
| 4,776,359 | 10/1988 | Smith et al. | 318/608 |
| 5,097,190 | 3/1992 | Lyons et al. | 318/701 |
| 5,107,195 | 4/1992 | Lyons et al. | 318/701 |
| 5,140,243 | 8/1992 | Lyons et al. | 318/701 |
| 5,315,224 | 5/1994 | Zelman | 318/701 |
| 5,325,026 | 6/1994 | Lyons et al. | 318/254 |
| 5,525,886 | 6/1996 | Lyons et al. | 318/701 |
| 5,689,165 | 11/1997 | Jones et al. | 318/701 |
| 5,736,828 | 4/1998 | Turner et al. | 318/701 |

*Primary Examiner*—William M. Shoop, Jr.
*Assistant Examiner*—Rita Leykin
*Attorney, Agent, or Firm*—Ann M. Agosti; Marvin Snyder

[57] ABSTRACT

An apparatus and method for estimating rotor position in and commutating a switched reluctance motor (SRM), using both a flux/current SRM angle estimator and a toothed wheel generating a magnetic pickup. Commutation is based on the flux/current SRM at startup and lower speeds. At higher speeds, when magnetic pickup sensed from the toothed wheel is sufficiently large in amplitude to create frequent reliable interrupts, commutation is based on signals from the toothed wheel magnetic pickup. Phase errors can be compensated by adjusting the angle input to the commutator as a function of estimated speed. Alternatively, the flux/current SRM angle estimator can be run in a background mode to tune the toothed wheel interrupt angle signal at different speeds.

10 Claims, 9 Drawing Sheets

SWITCHED RELUCTANCE MACHINE WITH TOOTHED-WHEEL ROTOR SENSOR

FIELD OF THE INVENTION

The present invention is related generally to switched reluctance machines, and, more particularly, to a rotor position estimation and machine commutation using a toothed-wheel rotor sensor in combination with a flux/current angle estimator.

BACKGROUND OF THE INVENTION

Switched reluctance drives are controlled by switching the phase currents on and off in synchronism with the rotor-position. Usually, this synchronism is achieved by feeding back the rotor position to the controller using a shaft position sensor such as a resolver or an optical encoder. Shaft sensors are not always sufficiently robust. Considerable work has been done on estimating rotor position in switched reluctance drives in order to eliminate the shaft position sensor. The most comprehensive of these approaches involves the use of either a flux/current map, as described in commonly-assigned U.S. Pat. No. 5,097,190 to J. P. Lyons and S. R. MacMinn on Mar. 17, 1992, (e.g. lookup tables) or a solution of a lumped parameter flux/current model, as described in commonly-assigned U.S. Pat. No. 5,107,195 to J. P. Lyons, S. R. MacMinn, and M. A Preston on Apr. 21, 1992, to determine rotor position. Both non-intrusive techniques derive a position estimate from stator flux-linkage and current of the torque producing phases. Machine stator flux is estimated by integrating the quantity (v-iR).

In commonly-assigned U.S. Pat. No. 5,325,026 to J. P. Lyons, S. R. MacMinn, and A. K. Pradeep on Jun. 28, 1994, these techniques are extended to low rotational speeds where the torque-producing current pulses are of sufficient duration to allow for significant error to accumulate in the flux integrators. These techniques eliminate the need for the shaft position sensor by solving models of the magnetic characteristics of the switched reluctance machine (SRM) in real-time. However, this can add a significant computational burden to the control processor, particularly for the high speed applications encountered with aircraft motors and generators. The increased computational requirements can lead to the use of expensive digital signal processors or the added expense of an additional processor dedicated to the shaft position estimation algorithms.

Commonly-assigned U.S. Pat. No. 5,525,886 to J. P. Lyons and M. A. Preston on Jun. 11, 1996 describes a method for estimating rotor position of a switched reluctance motor during rotor startup of low speed operation by applying a sequence of high-frequency, short-duration electric probing pulses to at least two inactive excitation phase windings of a multi-phase motor.

SUMMARY OF THE INVENTION

Accordingly, it would be desirable to provide a simple, low cost, robust sensor to be used to control a switched reluctance machine (SRM) in hostile high performance environments, e.g., a flight surface actuator servomechanism. It would also be useful to provide a fault-tolerant sensor with the addition of redundant magnetic pickups.

This invention uses a microprocessor to provide the commutation timing required by the individual SRM phases. The microprocessor based commutator uses a rotor state estimator or observer whose input can come from either of two sources: a toothed wheel interrupt signal or a flux/current SRM angle estimator. The rotor state estimator receives input signals including an electrical angle estimate and a sampling time stamp.

The SRM commutator takes its input signal from the flux/current SRM angle estimator when starting the switched reluctance machine, as the angle estimation algorithm is capable of operation to standstill. After the SR machine is up to a threshold speed where the signal created in the magnetic pickup of the toothed wheel sensor is sufficiently large in amplitude (signal amplitude being proportional to rotational speed) to create frequent reliable interrupts, the SRM commutator then takes its input from the toothed-wheel interrupt timing.

Phase errors can be introduced by the change in pickup signal amplitude with speed. This can be compensated by adjusting the angle input to the SRM rotor state observer as a function of estimated speed. Alternatively, the flux/current SRM angle estimator can be run in a background mode to tune the toothed wheel interrupt angle at different speeds.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

Figure 1:
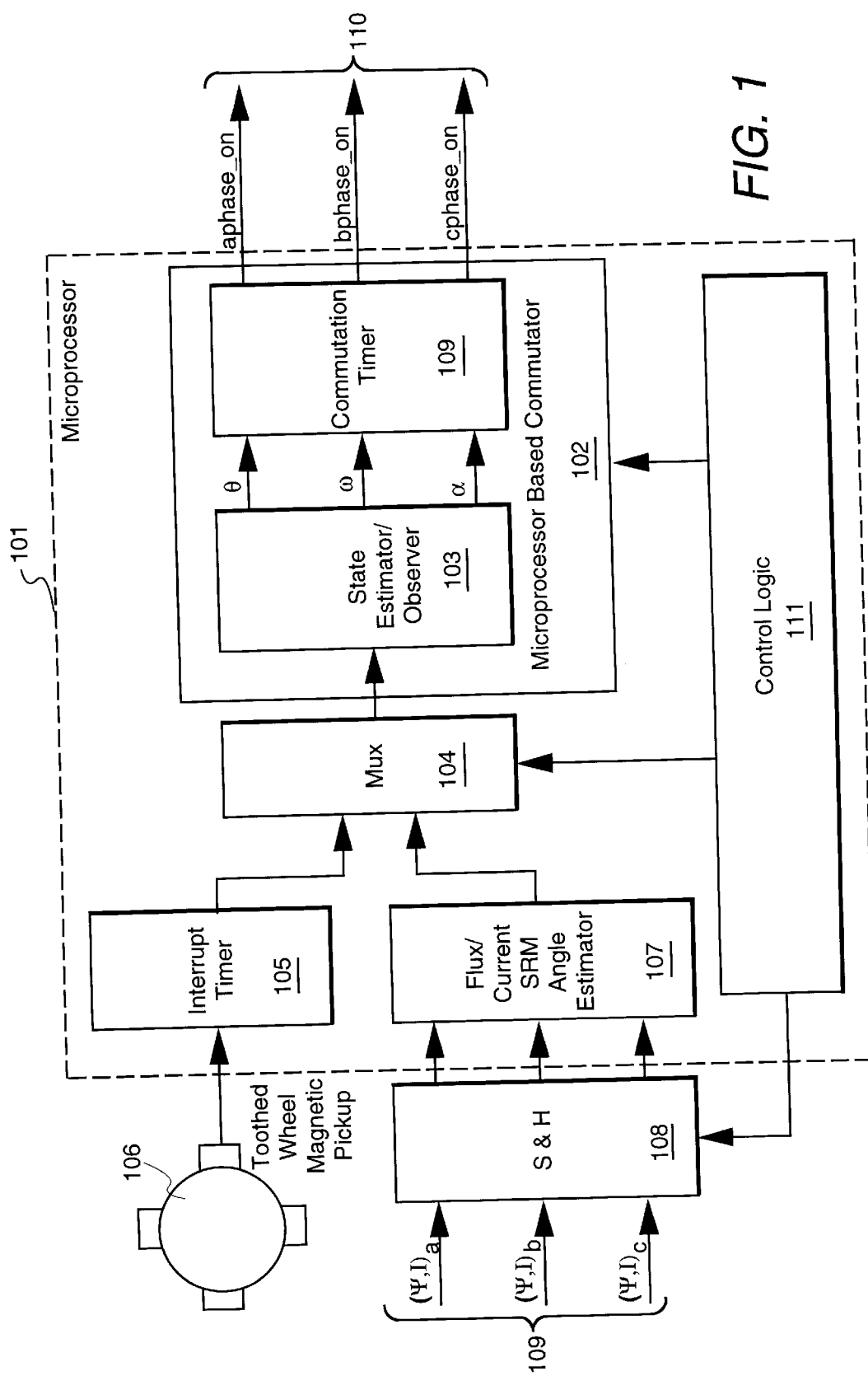
FIG. 1 is a block diagram of a toothed-wheel magnetic pickup, a rotor state estimator which receives its input from either the toothed-wheel interrupt signal or the flux/current SRM angle estimator, and a microprocessor based commutator.

FIG. 1 is a block diagram illustrating the present invention. A microprocessor 101 is used to provide the commutation timing required by the individual SRM phases. A microprocessor-based commutator 102 uses a rotor state estimator or observer 103 whose input arrives via a multiplexer (MUX) 104 from either of two sources: an interrupt timer 105 providing a toothed wheel interrupt signal based on magnetic pickup readings taken from a toothed wheel rotor 106, or from a flux/current SRM angle estimator 107 which in turn receives its input from a sample and hold (S&H) circuit 108, the circuit sampling the phase flux-linkages and current $(\Psi,I)_{a,b,c}$ 109 from each of the three phases a,b,c. The rotor state estimator 103 receives as input signals an electrical angle estimate and a sampling time stamp, and provides as output signals to a commutation timer 109 state estimates of angular position θ, velocity co and acceleration α. The commutation timer, in turn, generates appropriate commutation timing signals 110 controlling the three phases a,b,c. The state estimator 103, the commutation timer 109, and the generation of timing for the three machine phases are described in above-referenced U.S. Pat. No. 5,325,026. Appropriate control logic 111 is also included within the microprocessor 101.

The toothed wheel rotor 106 and interrupt timer 105 are optimally organized to have one tooth per rotor pole so that one interrupt signal is generated by the timer 105 and received by the state estimator 103 via the MUX 104 per electrical cycle of the SRM. This arrangement creates a fixed electrical measurement angle so that the new information for the state estimator 103 is contained in the time of interrupt.

The flux/current SRM angle estimator 107 uses sampled values of phase flux-linkages and currents Ψ, I as inputs to a model based algorithm to determine an estimate of the rotor angle, as described in above-reference U.S. Pat. Nos. 5,325,026, 5,097,190 and 5,107,195. The input signal to the rotor state observer 103 via the MUX 104 includes both the estimated angle and the sampling time stamp. This sampling can occur either synchronous or asynchronous to SRM rotation. Synchronous sampling will generally yield the best accuracy results; however, asynchronous sampling can be more useful at low rotational speeds.

When starting the SR machine, the flux/current SRM angle estimator 107 will provide an input signal to the SRM commutator 102 because the angle estimation algorithm is capable of operation at standstill. After the SR machine is up to a threshold speed where the signal created in the magnetic pickup sensed from the toothed wheel rotor 106 is sufficiently large in amplitude (signal amplitude being proportional to rotational speed) to create frequent reliable interrupts, control logic 111 will switch MUX 104 over such that the SRM commutator 102 will then be controlled by the toothed wheel interrupt timer 105.

Phase error can be introduced in several different manners. One type of phase error results from installation variability (such as mechanical alignment or electrical alignment) and is independent of speed. A second type of phase error is dependent on speed and results from eddy-currents produced by most conventional tooth sensors from magnetic or fixed delays in the sensors and electronics signal paths which become more significant with increasing speed. Both types of phase errors can be compensated in the present invention in either a foreground mode or a background mode.

Phase errors which are dependent on speed can be compensated by adjusting the angle input to the SRM rotor state observer 103 as a function of estimated speed. A motor including this type of phase compensation will not be dependent on speed and thus will provide an advantage over other approaches which would have to perform a compensation as a function of speed.

Phase errors which are dependent on installation variability can be compensated by running the flux/current SRM angle estimator 107 to tune the toothed wheel interrupt angle generated by the interrupt timer 105 at different speeds A motor including this type of phase compensation will be easier to install and service than motors that do not compensate for installation variability because mechanical and electrical alignment will not be critical.

Saliency in both the rotor and stator of a switched reluctance motor causes the SRM to have an airgap of varying effective area. Thus, the phase inductance seen from the terminals of the stator phase windings is a strong function of rotor position. The current in one phase winding of a switched reluctance motor and the flux linked by that winding are related by the winding inductance through the relationship $\Psi = L\,i$. The flux current methods for SRM rotor position estimation exploit the inherent magnetic characteristics of the SRM flux path to infer the rotor angular position.

Figure 2:
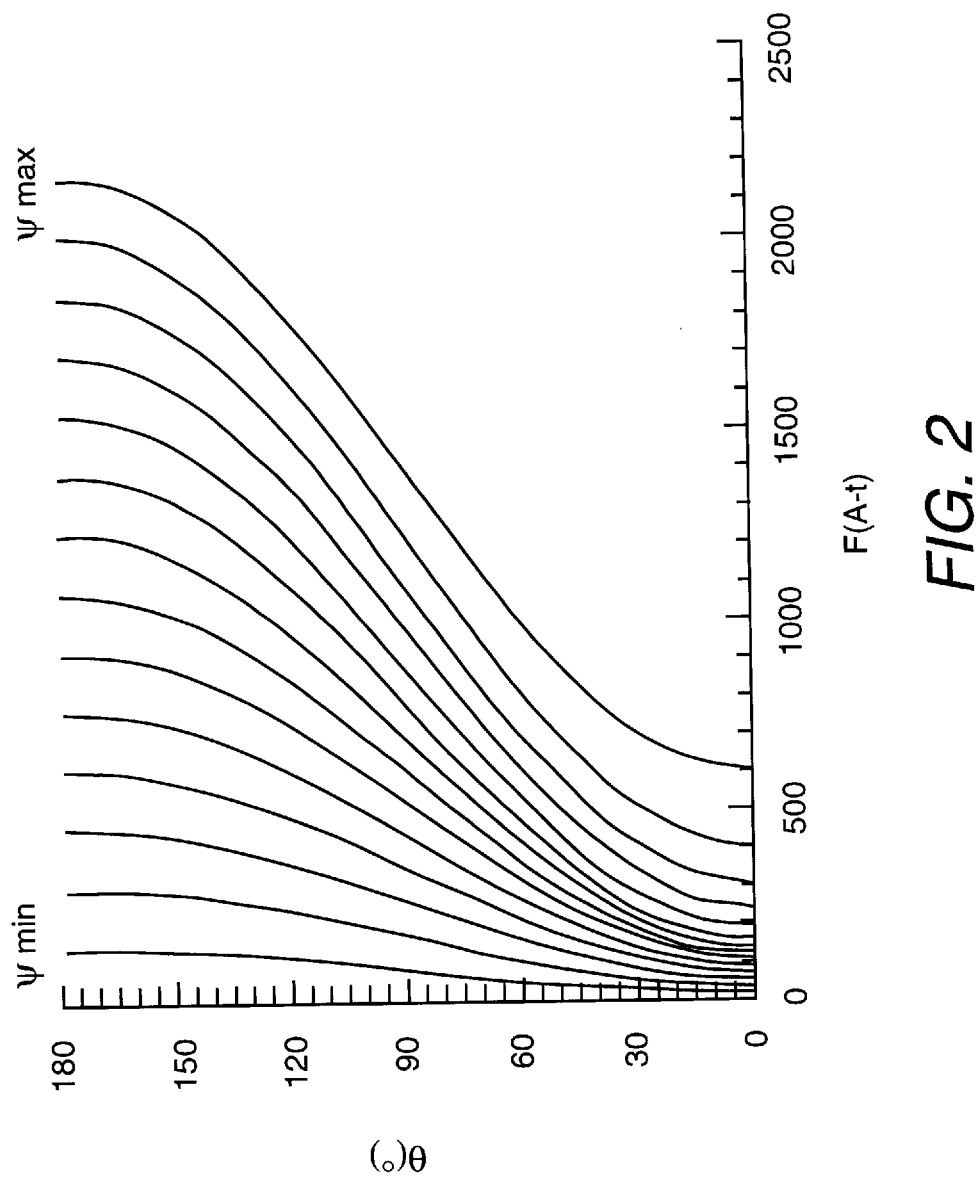
FIG. 2 is a graphical illustration of the SRM magnetization characteristic, particularly, of rotor angle versus phase current for different values of phase flux.

For each SRM phase the stator flux-linkage is estimated by $\Psi = \int V - IR$, where V is the applied phase voltage, I the phase current, and R the winding resistance. Then, given estimated V and measured I, the rotor position relative to alignment for each of the SRM phases can be obtained from the magnetic characteristic as illustrated in FIG. 2, which depicts rotor angle θ(°) (in electrical degrees) versus phase excitation F (A–t), wherein (A–t) denotes (Ampere-turns), for different values of phase flux $(\Psi)_i$, over i motor phases generally, where i=a,b,c for the particular three-phase embodiment illustrated herein, as described in above-referenced U.S. Pat. Nos. 5,097,190 and 5,107,195. This non-intrusive method monitors the normal torque-producing voltage and current waveforms in order to infer the rotor position. Additional logic then chooses the best available relative angle measurement and subsequently translates the relative rotor angle obtained from the magnetic characteristic into the absolute rotor angle for commutation control of the SRM.

This flux-current map technique for determination of SRM rotor angle, however, utilizes a single-phase magnetic characteristic as an underlying model. This model assumes that only the sensing phase is conducting current or that mutual coupling effects between conducting phases are negligible. For many applications neither of these assumptions is valid.

Figure 3:
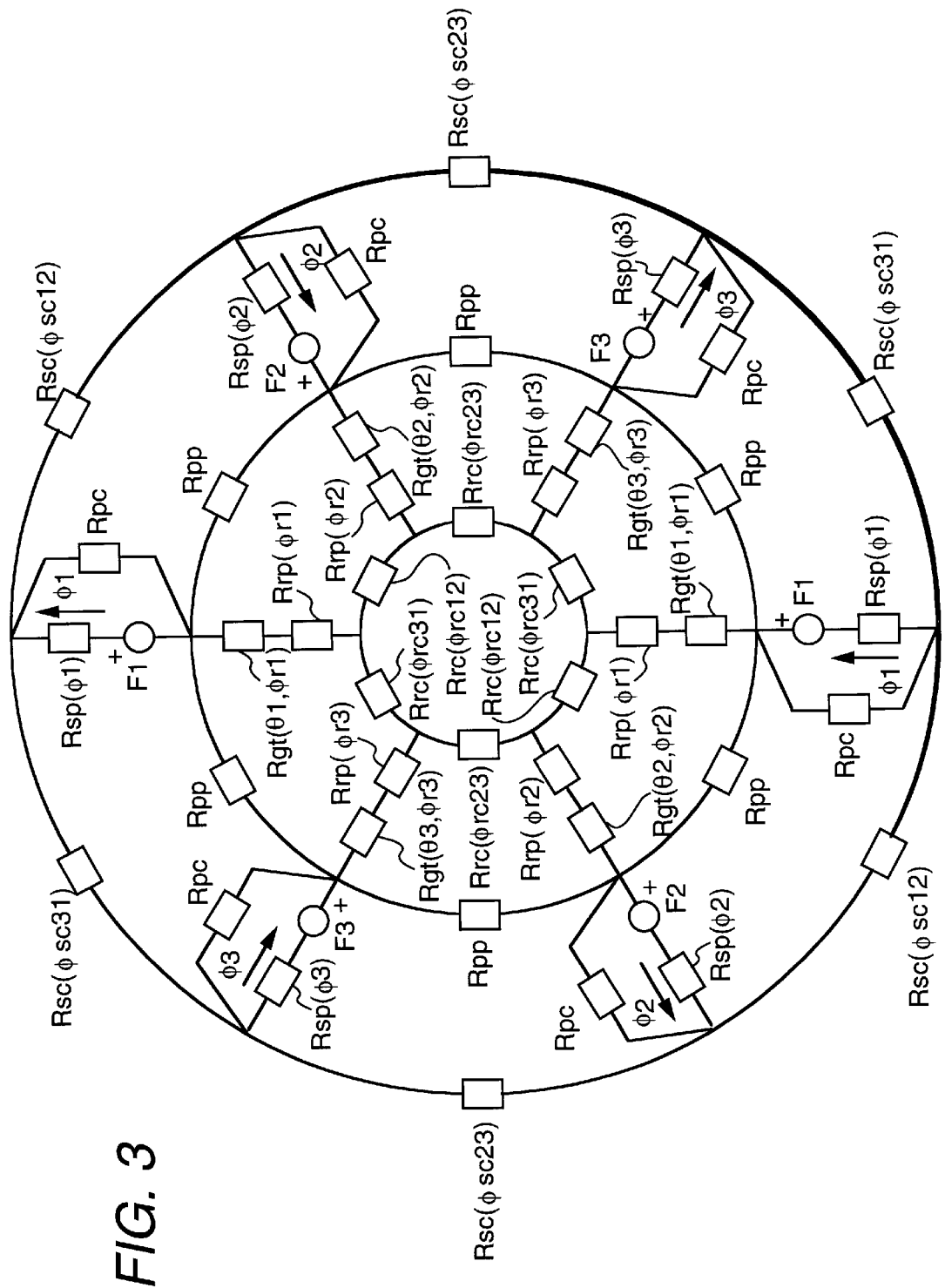
FIG. 3 illustrates a lumped parameter flux/current model useful in determining rotor position in accordance with a method of the present invention.

FIG. 3, therefore, presents a lumped-parameter model for a 3-phase switched reluctance machine which does account for mutual coupling between phases. In order to predict the rotor angle using this multi-phase model it is necessary to sample all phase currents and flux-linkage estimates simultaneously and then solve the reluctance mesh equations to isolate the gap-tip reluctance terms $(R_{gt}(\theta,\phi))_i$. The gap-tip reluctance function, at a known rotor flux level flux, can then be inverted to yield the relative angle to alignment $\theta_i$ for each of the stator poles. This lumped-parameter model is described in above-referenced U.S. Pat. Nos. 5,107,195 and 5,525,886.

Figure 4:
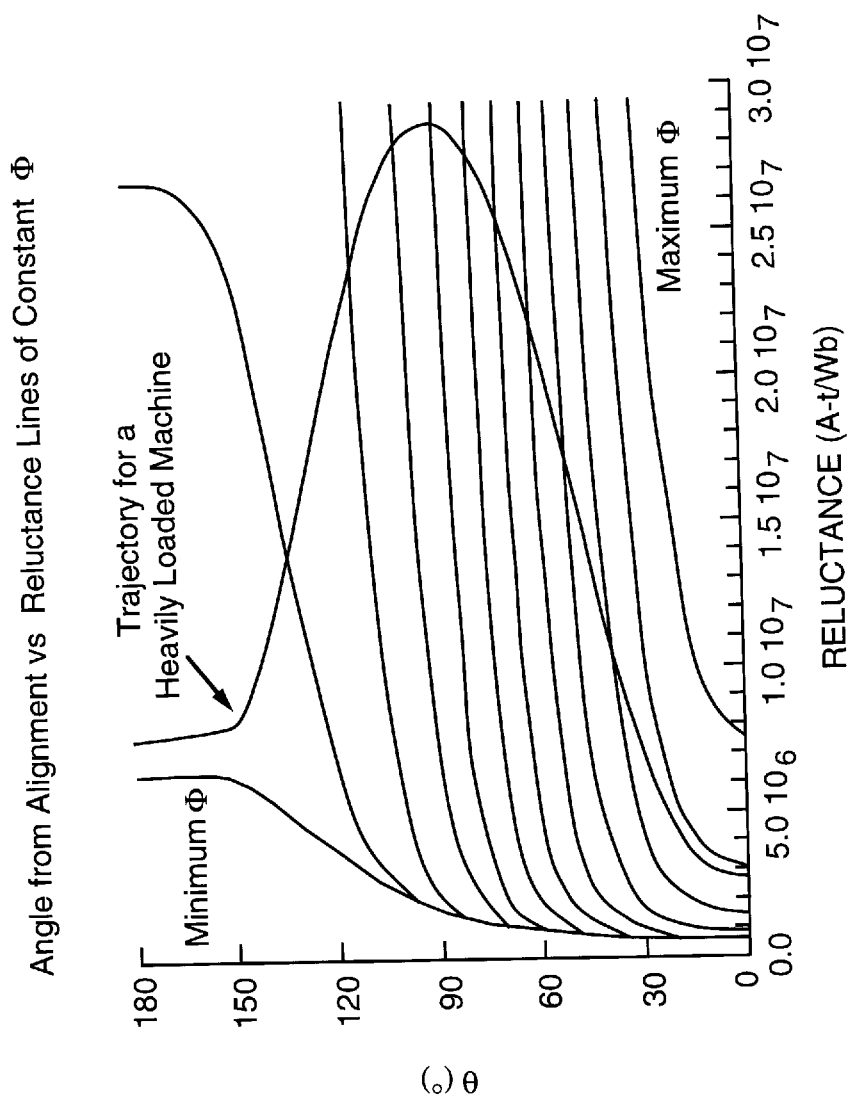
FIG. 4 is a graphical illustration of rotor angle from alignment versus reluctance for different values of flux.
Figure 5A:
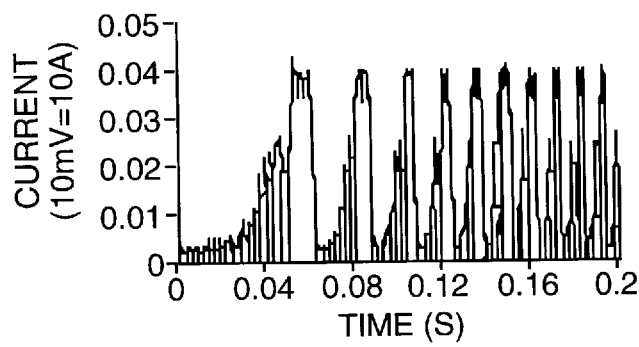
FIGS. 5a–5c illustrate probing pulses and phase-energizing current waveforms applied to each phase of a three-phase motor.
Figure 5B:
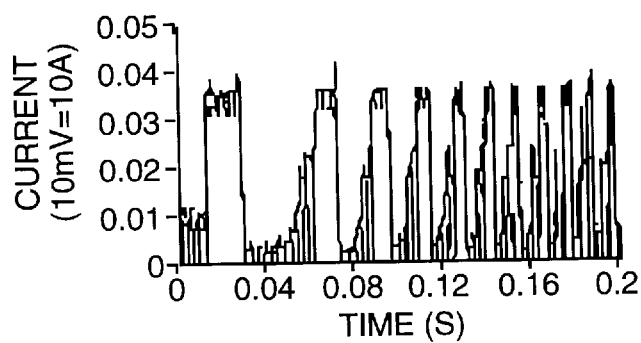
Figure 5C:
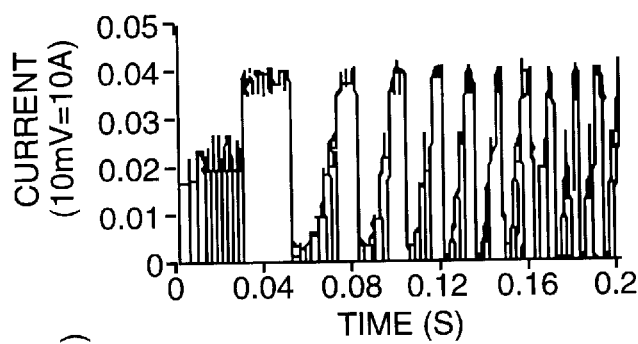
Figure 5D:
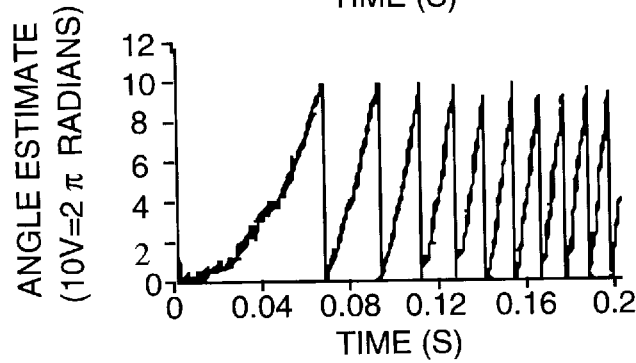
FIG. 5d illustrates the calculated angle (rotor position) obtained from the measured current pulses.

The inverse gap-tip reluctance function will most commonly be stored as a two-dimensional characteristic as in FIG. 4, which depicts rotor angle θ from alignment versus reluctance (A–t/Wb) for different values of flux Φ. The optimal absolute rotor position estimate is again obtained via post-processing logic.

Both the single and multi-phase flux current methods utilize a voltage integrator to estimate the stator flux-linkage. This estimation technique is particularly effective in the switched reluctance machine because the flux returns to zero at each cycle, allowing the integrator to be reset and thus preventing large error accumulation. However, the integrator accumulates offset errors in the measurement path, thereby limiting the low-frequency performance of these position estimator techniques, which effectively precludes their use at very low machine speeds.

For low speed position estimation utilizing the Flux/Current Method, high frequency voltage pulses are applied to inactive machine phases in order to circumvent the low frequency limitations of the flux-linkage integrators. The voltage pulses are designed to be long enough in duration to ensure measurable current and to allow high-frequency eddy currents to decay down, while also being short enough in duration to prevent integrator windup and prevent significant torque production by the phases being probed. The on-to-off duty cycle ratio of the pulses can be chosen to ensure that the current and flux will decay to zero prior to an ensuing test pulse, thus allowing the flux integrators to be periodically reset to a known value (i.e., zero).

This high frequency probing technique can be made very accurate in that for short duration, high-voltage pulses the IR drop term is essentially negligible, thus minimizing the influence of stator resistance variations and the integrator offset error accumulation.

To obtain initialization data for the rotor, SRM control logic 111 can either initially locate the rotor (assuming the machine is stopped) or begin to track a rotor that is already rotating (e.g. an SR generator). This can be achieved by applying a sequence of synchronized high frequency test pulses to all motor phases. At the end of the voltage-on cycle the flux-linkage and current for each of the phases is sampled in response to a command from control logic 111 and the rotor position calculated using either the single or multi-phase flux-current technique, as described earlier. A short sequence of such test pulses is sufficient to establish the initial operating state of the SRM (i.e. rotor position and velocity). However, if the rotor comprises one tooth per pole as in a preferred embodiment, its direction of rotation is known, and it is spinning sufficiently quickly, the toothed wheel interrupts can be immediately used to establish and initialize the rotor observer position and velocity.

Once the rotor is initially located, the SRM is started through a sequence of torque producing current pulses applied sequentially to the appropriate machine phases. For the initial few cycles the rotor speed and hence stator electrical frequency are too low to rely on the flux integrators for these torque producing phases. In order to locate the rotor as it begins to spin, the non-torque producing phases can be probed with synchronized high-frequency voltage pulses. At the end of the voltage-on cycle the flux-linkage and current for each of the probed phases is sampled and the rotor position inferred using either the single or a modified multi-phase flux-current technique. The multiphase technique can be modified in order to ignore the unknown flux-linkage corresponding to the torque-producing phase(s) —this is done by assuming that the unknown flux-linkage is zero thus effectively reducing the multi-phase coupled reluctance model (FIG. 3) to a single phase reluctance model.

FIG. 5 is an oscilloscope trace of a 3 phase SRM starting using this technique, in the manner discussed in the above-referenced U.S. Pat. Nos. 5,525,886 and 5,097,190. There is an initialization sequence of twenty probing pulses on all three phases, at the conclusion of which control logic 111 initiates a starting sequence by energizing phase B. The SRM accelerates while the high frequency probing pulses continue on the two non-torque producing phases. In this trial the probe voltage pulses are 200 vdc, 100 μs on and 300 μs off. This mode of operation continues until the rotor reaches a sufficient transition speed where the integrator errors are tolerable, whereupon the intrusive probing is stopped. If the SRM drive operates continuously at low speeds as in a servomechanism application, controller logic 111 should be capable of initiating these probing pulses whenever rotor speed falls below the transition speed.

Figure 6:
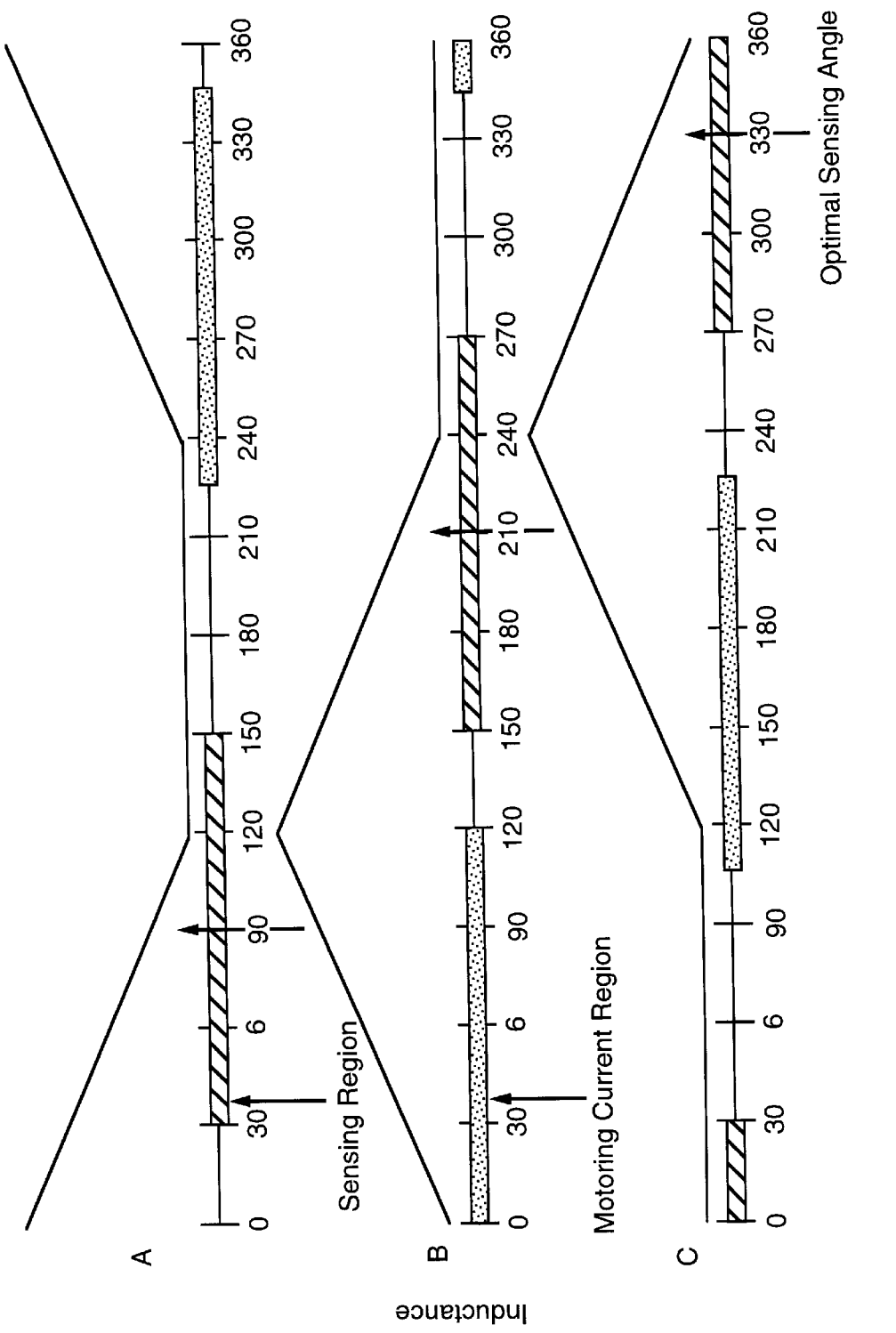
FIG. 6 is a graphical illustration of phase inductance versus rotor angle which shows the sensing region for each respective phase for a three-phase SRM.

FIG. 6 illustrates both the motoring torque-producing regions and sensing/probing regions superimposed on an idealized inductance vs. rotor angle characteristic for a 3 phase SRM. During starting, one phase at a time is excited with 120 (electrical) degrees for torque production. The remaining two phases are available for probing pulses. Each of the optimal sensing regions are thus 120 degrees in width centered at 90 degrees relative to phase alignment. The three contiguous regions provide continuous sensing opportunities throughout the electrical cycle as described in the above-referenced U.S. Pat. Nos. 5,525,886 and 5,097,190.

Commutation control of an electronically commutated machine is achieved with shaft position information available at discrete time instants, which are not, in general, the required commutation times. Such commutation means are used for microprocessor-based commutation schemes, in particular, for machine commutation schemes based on inferred shaft position information.

Figure 7:
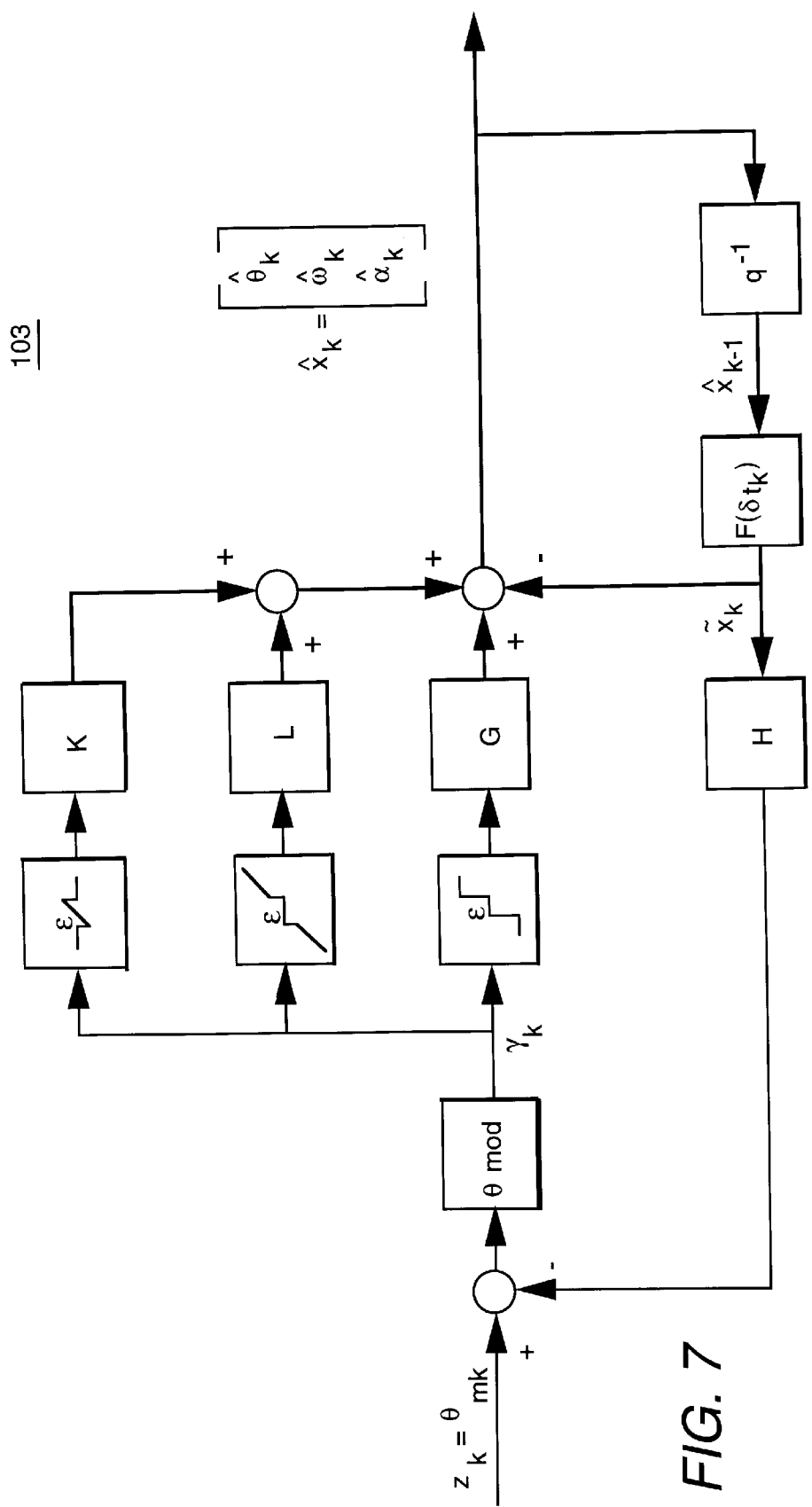
FIG. 7 is a block diagram of a mechanical state estimator employing a combination of a Kalman filter and sliding mode observer, according to a preferred embodiment of the present invention.

The filter and state observer 103 provide estimates of the mechanical states of the rotating machine i.e. angular position, velocity and/or acceleration. In one embodiment, a Kalman filter of variable gain is used for estimating the mechanical states. In another embodiment, a sliding mode observer is used for estimating the mechanical states. In a preferred embodiment, shown in FIG. 7, a combination of a sliding mode observer and a constant gain Kalman filter is used to obtain the mechanical state estimates—the Kalman filter with small constant gains provides smooth tracking of a steadily rotating machine while the sliding mode observer provides fast acquisition during transient conditions, as described in above-referenced U.S. Pat. No. 5,325,026.

Figure 8:
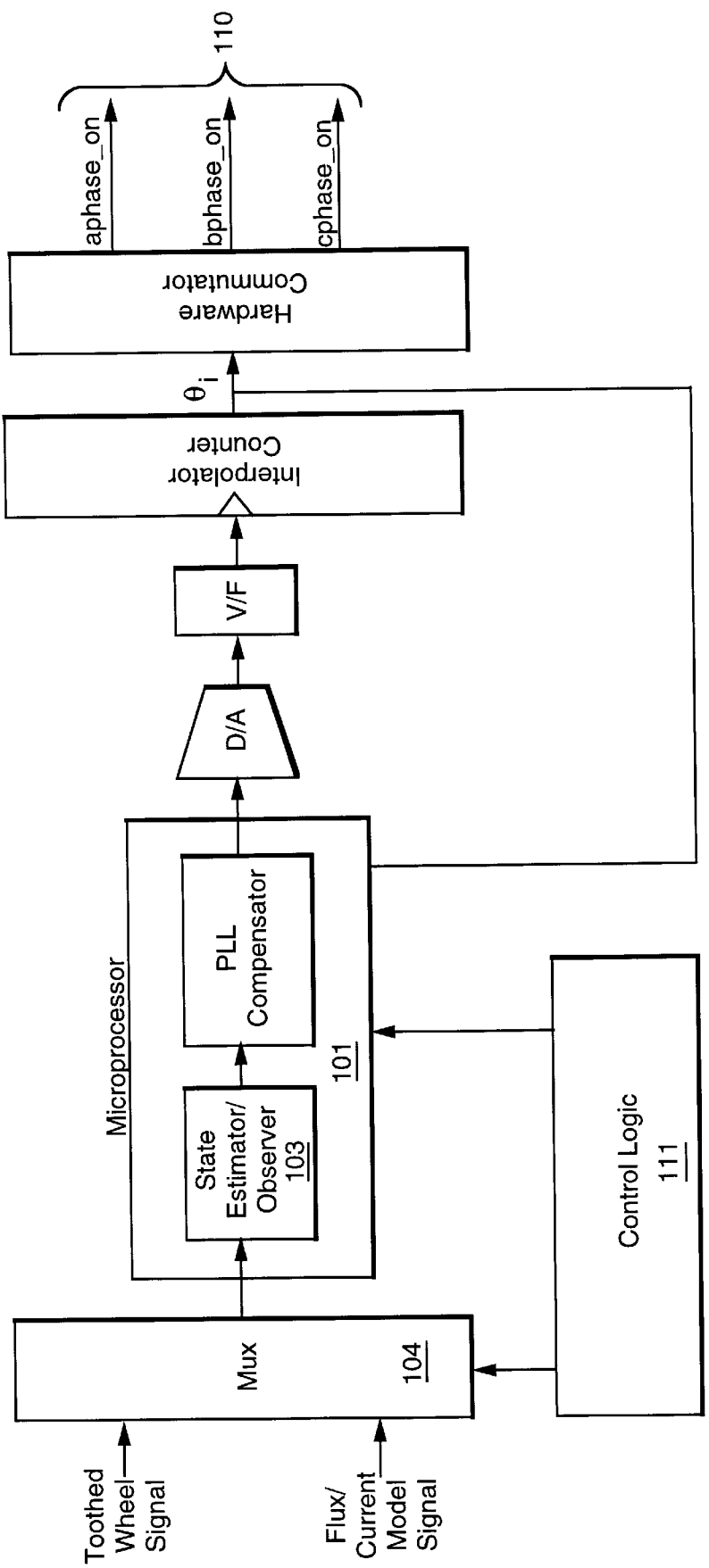
FIG. 8 is a block diagram illustrating a phase-locked-loop means for translating mechanical state estimates into machine phase commutation signals.

The mechanical state estimates are translated into machine phase commutation signals. In one embodiment, depicted in FIG. 8 and described in above-referenced U.S. Pat. No. 5,325,026, a phase-locked-loop, closed in software, forces a hardware counter to track and interpolate between the discrete time position estimates. This counter's output emulates the output of an R/D converter and can be directly used in a variety of hardware commutation schemes, as described in above-referenced U.S. Pat. No. 5,325,026.

Figure 9:
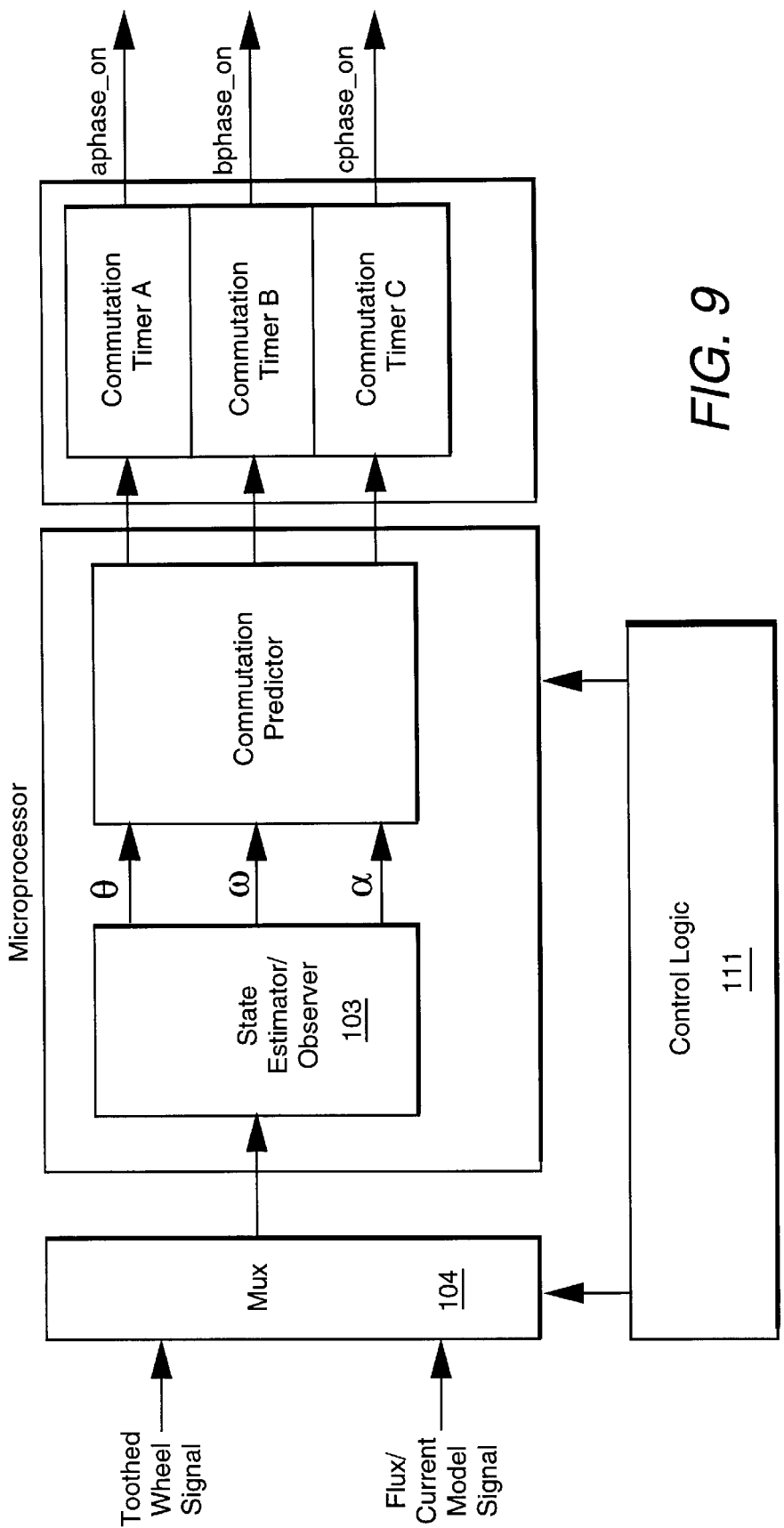
FIG. 9 is a block diagram illustrating commutation control software means for translating mechanical state estimates into machine phase commutation signals, according to a preferred embodiment of the present invention.

In a preferred embodiment, FIG. 9, commutation control logic 111 software translates the desired commutation angles and mechanical state estimates into commutation event times. These commutation event times are then loaded into hardware counters which will trigger actual phase commutation upon expiration, as described in U.S. Pat. No. 5,325,026.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A switched reluctance machine, comprising:

a toothed-wheel rotor for providing magnetic pickup signals;

an interrupt timer for receiving the magnetic pickup signals and generating interrupt signals;

a flux/current angle estimator for receiving phase flux-linkage and current signals from the machine and generating angle estimation signals;

control logic for determining whether the amplitude of the magnetic pickup signal falls below a predetermined threshold;

a multiplexer for providing multiplexer signals comprising the angle estimation signals when the amplitude of the magnetic pickup signal falls below the predetermined threshold and the interrupt signals when the amplitude of the magnetic pickup signal rises above the predetermined threshold; and a commutator for receiving the multiplexer signals and generating commutation signals.

2. The machine of claim 1, wherein the rotor comprises one tooth per rotor pole.

3. The machine of claim 1, wherein the multiplexer signals include an electrical angle estimate, and wherein the flux/current angle estimator is adapted to compensate for phase errors of the electrical angle estimate by adjusting the angle estimate as a function of an estimated speed of the rotor.

4. The machine of claim 1, wherein the multiplexer signals include an electrical angle estimate, and wherein the flux/current angle estimator is adapted to compensate for phase errors of the electrical angle estimate by tuning the interrupt signals.

5. The machine of claim 1, wherein the commutator comprises a state estimator/observer and a commutation timer, the state estimator/observer being adapted to receive the multiplexer signals, use the multiplexer signals to estimate the mechanical state of the rotor, and provide the estimated mechanical state to the commutation timer, the commutation timer being adapted to translate the estimated mechanical state and generate the commutation signals.

6. The machine of claim 5, wherein the state estimator/observer includes a constant-gain Kalman filter and a sliding mode observer.

7. A method for commutating a switched reluctance machine, comprising:

providing magnetic pickup signals from a toothed-wheel rotor;

using the magnetic pickup signals to generating interrupt signals;

using phase flux-linkage and current signals from the machine to generate flux/current angle estimation signals;

providing input signals comprising the angle estimation signals when the amplitude of the magnetic pickup signal falls below a pre-determined threshold and the interrupt signals when the amplitude of the magnetic pickup signal rises above the predetermined threshold; and using the input signals to generate commutation signals.

8. The method of claim 7, further comprising providing one tooth per rotor pole.

9. The method of claim 7, wherein the input signals include an electrical angle estimate, and further including compensating phase errors of the electrical angle estimate by adjusting the angle estimate as a function of an estimated speed of the rotor.

10. The method of claim 7, wherein the input signals include an electrical angle estimate, and further including compensating phase errors of the electrical angle estimate by tuning the interrupt signals.

* * * * *